H. BOWEN.
CENTERING ATTACHMENT FOR CUTTING OFF MACHINES.
APPLICATION FILED MAR. 21, 1913.

1,109,957. Patented Sept. 8, 1914.

Witnesses
Harold O. Van Antwerp
Pearl Raymond

Inventor
Harry Bowen
By Luther V. Moulton
Attorney

UNITED STATES PATENT OFFICE.

HARRY BOWEN, OF JACKSON, MICHIGAN, ASSIGNOR TO THE HOLTON COMPANY, OF JACKSON, MICHIGAN, A CORPORATION OF MICHIGAN.

CENTERING ATTACHMENT FOR CUTTING-OFF MACHINES.

1,109,957. Specification of Letters Patent. Patented Sept. 8, 1914.

Application filed March 21, 1913. Serial No. 755,838.

*To all whom it may concern:*

Be it known that I, HARRY BOWEN, a citizen of the United States of America, residing at Jackson, in the county of Jackson and State of Michigan, have invented certain new and useful Improvements in Centering Attachments for Cutting-Off Machines; and I do hereby declare the following to be a full, clear, and exact description of the invention, such as will enable others skilled in the art to which it appertains to make and use the same.

Figure 1:
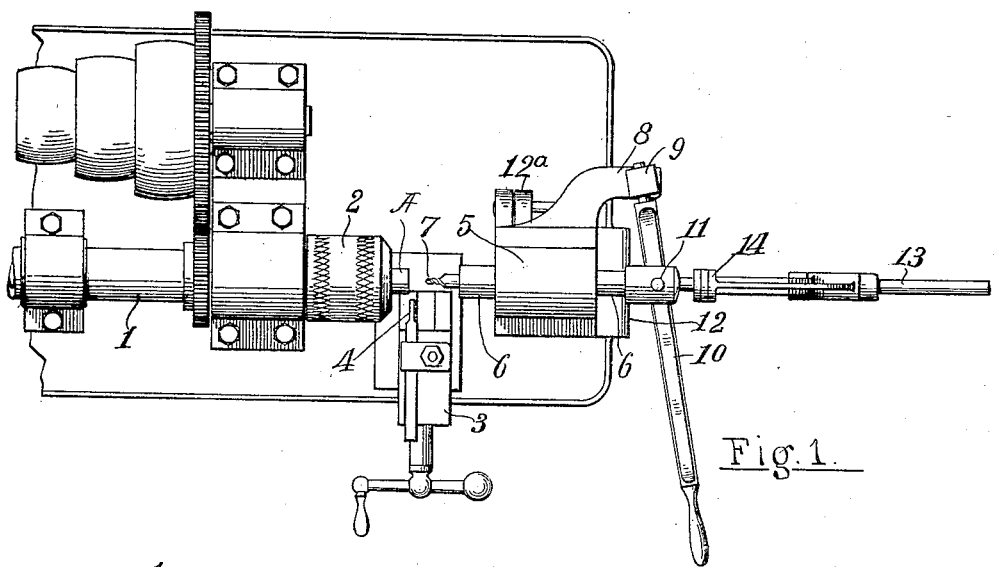
Figure 2:
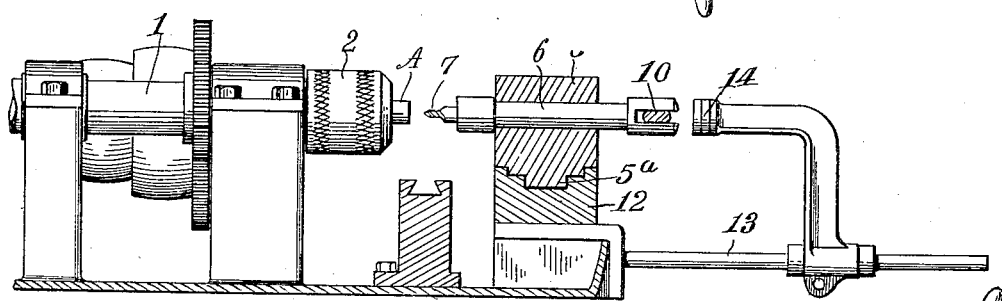
Figure 3:
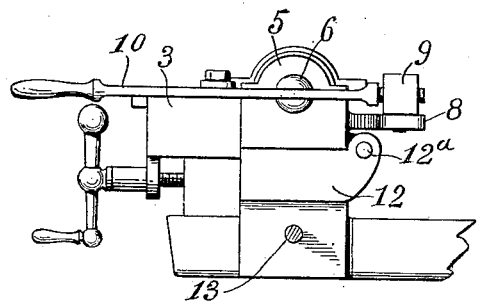
Figure 4:
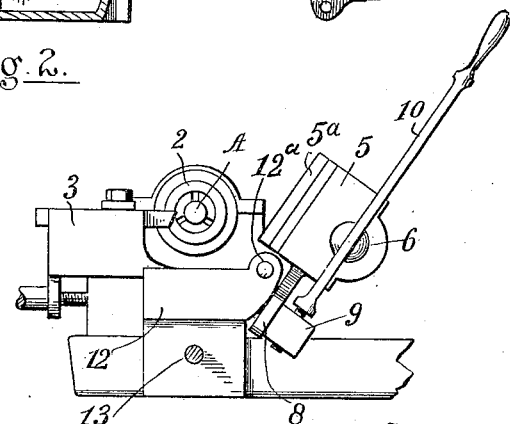

My invention relates to improvements in centering attachments for cutting off machines, and its object is to provide a device for producing suitable recesses in the ends of rods or shafting to receive lathe centers, adapted to operate in conjunction with a cutting off machine and adapted to be readily attached thereto and it consists essentially of a suitable bed adapted to be attached to the frame of a cut off machine, a bearing pivoted to the bed to swing out of the way of the work during the cutting operation, and swing to operative position when the centering tool is to be used, a tool holder slidable in said bearing and means for manually sliding the tool holder and shifting the position of the bearing, as hereinafter more fully described and particularly pointed out in the claims, reference being had to the accompanying drawing in which:

Figure 1 is a plan view of the device embodying my invention. Fig. 2 is a front elevation of the same partially in vertical section. Fig. 3 an end elevation of the device, in position for operating the centering tool, and Fig. 4 the same with the centering device swung out of the way to permit of operating the cut off machine.

Like numbers refer to like parts in all of the figures.

1 represents the hollow arbor of a cut off machine; 2 the chuck on the same; 3 the slide carrying the cut off tool, and 13 a rod carrying a stop 14 to measure the length to be cut off. All as usual in an ordinary cut off machine.

My device in the form shown, consists preferably of a base adapted to be secured to the frame of a cut off machine and provided with an arm 12.

5 is a bearing or head pivoted to the arm 12 as at $12^a$ to swing upward and rearward out of the way of the material "A" to be cut off. This bearing and bed have engaging tongue and groove connection as at $5^a$ by which the bearing is held rigidly when adjusted for centering the work.

6 is a tool holder arranged in alinement with the arbor 1 and longitudinally slidable in the bearing.

7 is a centering tool carried by one end of the holder and adapted to form a suitable recess in the axis of the work to receive a lathe center. The other end of the tool holder 6 is bifurcated and pivoted to a lever 10 for manually moving the holder and for turning the bearing on its pivot, as occasion arises. An arm 8 projects rearward from the bearing, and in this arm is pivotally mounted a block 9, in which the end of the lever 10 is slidably mounted to accommodate the rectilinear movement of the holder 6.

From the foregoing description the operation of my device will be readily understood without further explanation.

What I claim is:—

1. In a machine of the character described, a bed, a bearing having pivotal connection with the bed and provided with a laterally directed arm, a centering tool holder slidable in the bearing and carrying a centering tool at its inner end, the outer end of the holder being bifurcated, and a lever pivotally connected in the bifurcation of the holder and having slidable connection with the arm of the bearing to operate the centering tool holder and to shift said bearing on its pivot.

2. In a machine of the character described, a bed, a block mounted on the bed, a bearing having pivotal connection with said block, a centering tool holder slidable in the bearing and carrying a centering tool at its inner end, and a lever pivotally connected to the holder and having slidable connection with the bearing to operate the centering tool holder and to move said bearing on its pivot away from said block, the block having a groove and the bearing having a tongue to fit in the groove to hold the bearing against lateral movement upon approaching this centering tool holder.

In testimony whereof I affix my signature in presence of two witnesses.

HARRY BOWEN.

Witnesses:
WILLIAM W. FISK,
CLARENCE O. A. SMITH.